United States Patent [19]

Hisatake et al.

[11] Patent Number: 4,524,309
[45] Date of Patent: Jun. 18, 1985

[54] SAFETY CONTROL DEVICE OF COMMUTATOR MOTORS

[76] Inventors: Michio Hisatake, No. 4, Tamadaira, 2-chome, Hino-shi, Tokyo; Kazuji Yamamoto, No. 52-1, Saiwai-cho, 4-chome, Tachikawa-shi, Tokyo; Toru Hyodo, No. 17-27, Shibazaki-cho, 2-chome, Tachikawa-shi, Tokyo; Yoshitaka Takahashi, No. 20-28, Hon-cho, 2-chome, Koganei-shi, Tokyo, all of Japan

[21] Appl. No.: 332,359

[22] Filed: Dec. 18, 1981

[30] Foreign Application Priority Data

Dec. 22, 1980 [JP] Japan .................................. 55-180540

[51] Int. Cl.³ ........................................... H02K 17/32
[52] U.S. Cl. .................................. 318/434; 318/331; 318/345 C; 318/345 G
[58] Field of Search ..... 318/345 C, 345 CA, 345 AB, 318/345 G, 434, 345 H, 345 D, 331; 361/23, 30, 31, 33, 54, 55, 56, 57, 93, 100

[56] References Cited

U.S. PATENT DOCUMENTS 3,249,840  5/1966  Eriksson et al. ......... 318/345 CA X
3,443,189  5/1969  Gilbreath ........................ 318/345 C
3,477,007  11/1969  Ducommun et al. ............... 318/434
3,564,372  2/1971  Vogelsberg et al. ........... 318/434 X Primary Examiner—Ulysses Weldon
Attorney, Agent, or Firm—Michael J. Striker

[57] ABSTRACT

A safety control device for a speed control circuit of a commutator motor having an ignition circuit includes a circuit for detecting an armature current and defining whether the commutator motor is energized with a supply current or with a free wheel current, a maintaining circuit for discriminating if the detected result is a continuously energized condition or an intermittent condition, and a bistable circuit. The maintaining circuit smoothes the detected voltage of the energized motor and maintains the voltage over at least one cycle of the power source and functions temporarily in an equivalent manner of continuous energization of the motor when power source is applied to the motor. The bistable circuit nullifies the ignition circuit of the motor control when the motor is in an intermittent energization and switches the ignition circuit into an effective condition as the maintaining circuit comes to accumulate the voltage above the predetermined level while no speed designation is made to the speed control circuit of the motor.

1 Claim, 2 Drawing Figures

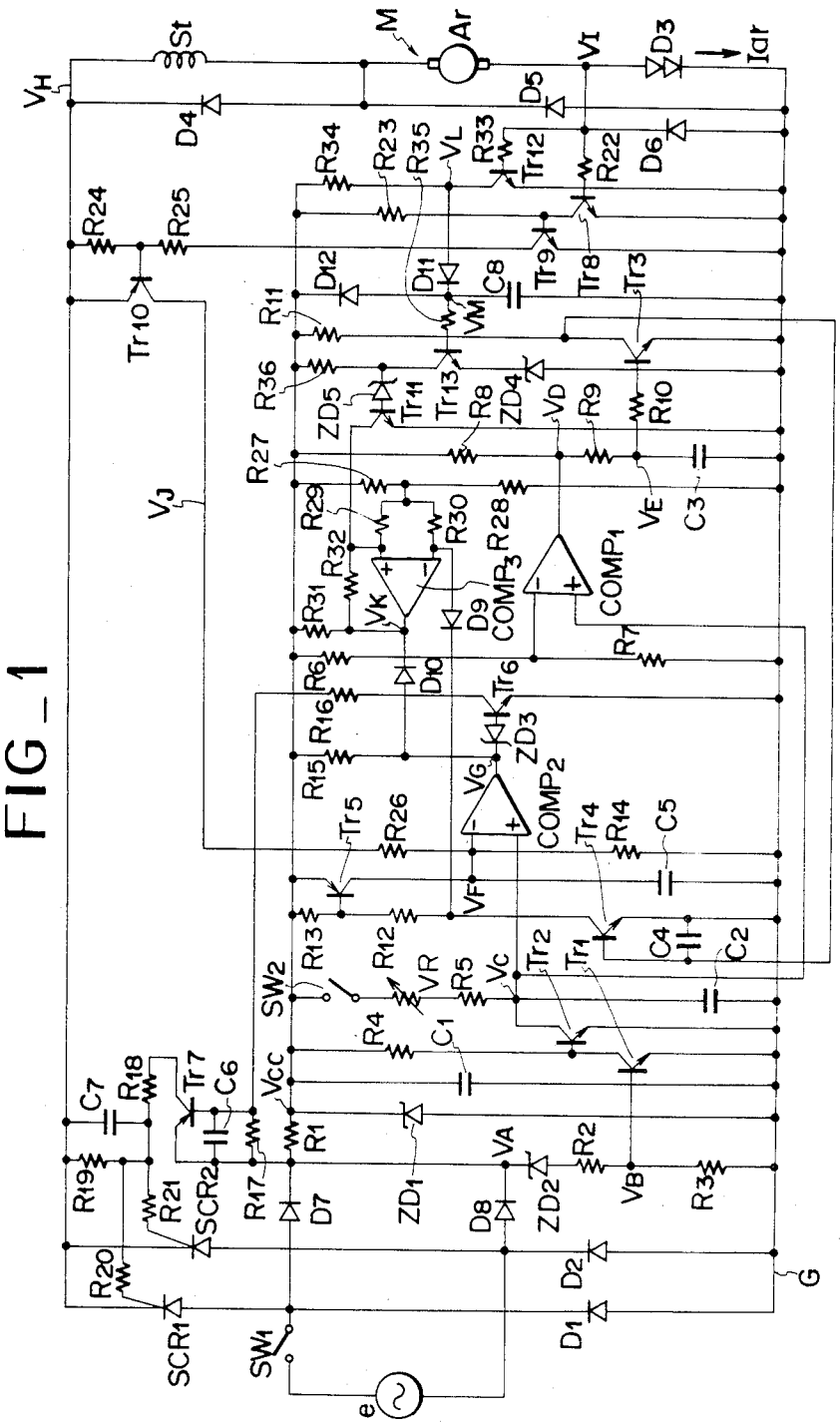
FIG_1

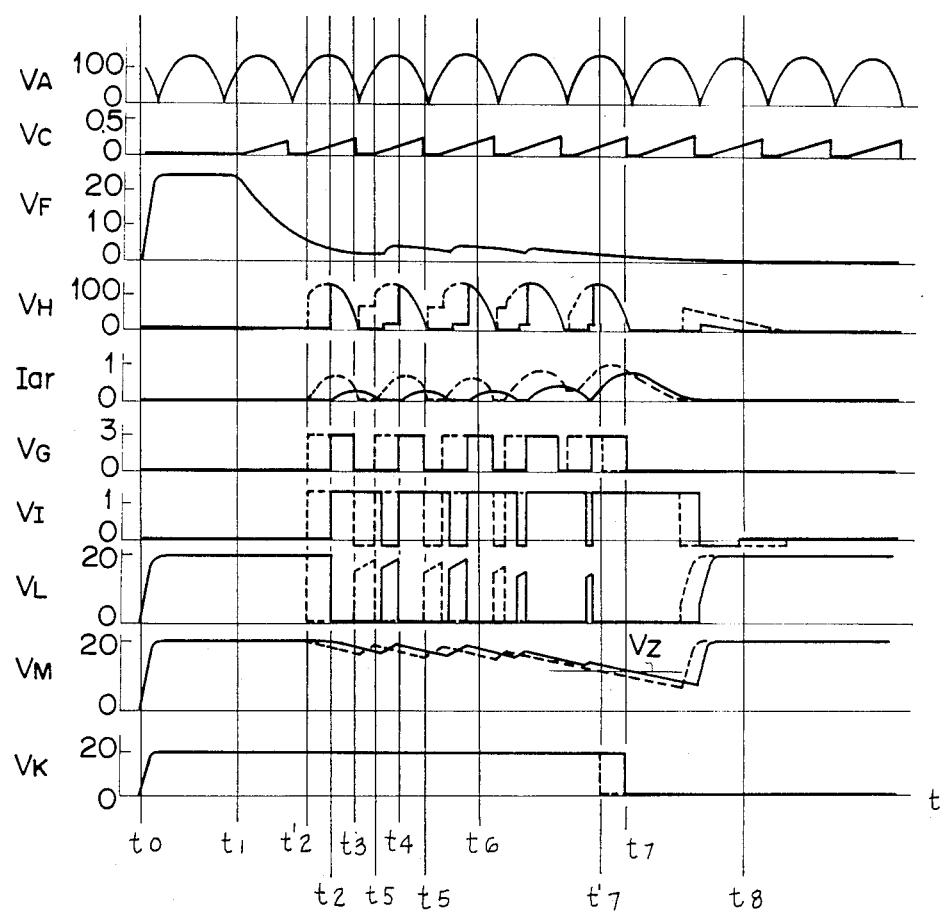
FIG_2

SAFETY CONTROL DEVICE OF COMMUTATOR MOTORS

BACKGROUND OF THE INVENTION

The invention relates to a speed control device of a commutator motor, and more particularly relates to a safety control of the motor in a circuit controlling the speed of the commutator motor by means of a semiconductor control element for rectifying the full waves of a power source current. According to the invention, if an extraordinary load is applied to a feed back control device provided to reduce the speed variation of motor due to the variation of load, the load current of motor is instantly stopped to prevent the motor from being overheated and burnt. With the subsequent stop designation, the motor becomes ready to be driven again, thereby to solve the problem of the safety and maintenance as to the conventional permanent stop or automatic restoration of the motor. Further in the conventional speed control circuit of the motor, the motor is instantly driven with application of the power source in a condition that the latter is blocked while the motor is designated to drive. Such a dangerous phenomenon is prevented by the invention. According to the invention, the motor, once stopped, will be started only with a stop designation applied after the control power source is applied. Thus the invention provides the abovementioned two functions in a speed control circuit of commutator motor, which are commonly controlled by an electronic control circuit.

As a conventional device of such a kind, it has been proposed for detecting an excessive load of a motor to set a certain data which is a maximum permissible value to normal performance of the motor so as to limit the conduction angle of voltage waves supplied to the motor, and which is adapted to determine the ignition position of a maximum ignition phase irrespectively of a speed designation of motor for the purpose of blocking the current flowing to the motor when the ignition phase has reached the maximum ignition phase, by means of a feedback control to compensate the variations of rotation speed of motor which may be caused by the variations of load. In this case, it is desirable that the set value is such that the ignition phase as the result of the feedback control comes to the maximum one on a condition that an excess load is applied to the motor in case a maximum speed is designated. So long as the motor is controlled in the vicinity of the set value, the rotation speed of motor is constant, and accordingly a high speed is maintained with a provision of self-cooling function preventing the current value form overheating or burning the motor. Such a predetermined maximum ignition phase is, however, not suitable to the security as to the excess load in a low speed control of the motor.

Namely, if the motor is overloaded under a low speed control, the ignition phase advances to maintain the rotation speed by way of the feedback control. If the feedback amount increases as far as the control of the maximum ignition phase, the current flowing to the motor is blocked. The motor is however maintained in a low speed rotation as long as it is controlled in the vicinity of the set value. Therefore the selfcooling function of motor is lowered compared with that in a high speed rotation. Precisely the motor speed electromotive force, i.e. the voltage functioning in the direction for blocking the motor current due to the rotation of motor, is lowered, and equivalently the inner impedance of motor is lowered. This increases the load current of the motor which is driven with the equivalent voltage as in the high speed rotation thereof due to the same ignition angle. Therefore the motor driven with a value in the vicinity of the set value is more overheated in a low speed control than in a high speed control. This shows that the set value is improper to the security of the motor. For the purpose of eliminating such a defect, it has been proposed to provide some set values in accordance with the rotation speeds and different amounts of loads for maintaining the security of the motor. Such device is however, complex in structure and costly.

SUMMARY OF THE INVENTION

This invention has been provided to eliminate the defect and disadvantages of the prior art. Namely, the invention comprises an armature current detecting circuit for detecting successively with the advance of the power source periods if the commutator motor is energized with a supply current or with a free wheel current, a maintaining circuit for discriminating if the detected result is a continuously energized condition or the equivalent condition or if the energized condition is intermittent, the maintaining circuit smoothing the detected voltage of energized motor and maintaining the voltage over at least one cycle of the power source so as to prevent the detected result from influencing the control of the motor, if the variation of the energized condition is few, said maintaining circuit temporarily functioning in an equivalent manner of the continuous energization of the motor at the time of application of the power source, and a bistable circuit nullifying an ignition circuit of semiconductor control elements of the motor control when the motor is in an intermittent energization, even at the initial time of application of the power source, the bistable circuit switching the ignition circuit into an effective condition with a signal indicating the effectiveness of a motor speed designating circuit when the continous energization of motor is interrupted. Especially by employing a free wheel diode in connection with the armature of motor, the ignition phase from the intermittent energization to the continuous energization will meet any load conditions in either of the high speed designation and the low speed designation of the motor. Moreover the conduction angle will be increased to 90° or a desired degree with respect to a small amount of current provided by a small speed electromotive force functioning in a direction preventing the maintenance of armature current in a low speed control rather than in a high speed control. Thus a continuous energization or an equivalent condition may be obtained with a small amount of current more effective to mullify the ignition circuit. Thus a security circuit is provided to prevent the excessive temperature rise in a low speed control of the motor in which the cooling function is comparatively lowered. Moreover, in case a speed designation is made before the power source is applied, the motor is prevented from starting simultaneously with application of the power source.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a control circuit of a commutator motor according to the invention; and FIG. 2 is a diagram of waves showing the currents and voltages at the parts of the control circuit.

DETAIL DESCRIPTION OF THE INVENTION

The invention will be described on the basis of a preferred embodiment in FIGS. 1 and 2. In reference to FIG. 1, (e) is an A.C power source, (M) is a commutator motor, (Ar) is an armature of the commutator motor, and (St) is a field winding of the motor. ($D_1$), ($D_2$) are diodes for supplying the current to the motor. ($SCR_1$), ($SCR_2$) are thyristors for supplying current to the motor. The diodes ($D_1$), ($D_2$) and thyristors ($SCR_1$), ($SCR_2$) form a mixed bridge circuit for phase control of full waves. ($D_3$) is a group of diodes for detecting the current flowing through the armature (Ar), and consists of a number of diodes connected in series to each other as shown to detect the voltage lowering in the normal direction thereof. ($D_4$) is a free wheel diode for providing a path to maintain the energization of the field winding (St) for a predetermined time after the thyristors ($SCR_1$), ($SCR_2$) are turned off, and for providing a path to take out a speed electromotive force as will be described in detail hereinafter. ($D_5$) is a free wheel diode for short-circuiting the voltage generated at the armature (Ar) when the thyristors ($SCR_1$), ($SCR_2$) are turned off. Diode (6) forms a path to take out the speed electromotive force. Diodes ($D_7$), ($D_8$), together with the diodes ($D_1$), ($D_2$), form a full wave rectifying bridge for supplying a full wave rectifying voltage ($V_A$) of the power source voltage (e) so as to control the ignition of the thyristors ($SCR_1$), ($SCR_2$). ($ZD_1$) is a zener diode, ($C_1$) is a smoothing capacitor and ($R_1$) is a resistor, and these elements supply a constant voltage (Vcc) for igniting the thyristors.

($ZD_2$) is zener diode which is operated by the full wave rectifying voltage ($V_A$). The zener voltage is extremely lower in comparison to the full wave rectifying voltage ($V_A$), and is conductive with all the phases of the voltage ($V_A$), except the vicinity of potential 0 thereof. The voltage ($V_B$) divided by resistors ($R_2$), ($R_3$) is therefore of the potential 0 only at the vicinity of the potential 0 of the voltage ($V_A$). The divided voltage ($V_B$) is the base voltage of transistor (TR1), and is made flat except the 0 potential due to the voltage property between the base and emitter of the transistor. In FIG. 2, the lateral axes show a time (t) and the vertical axes show the voltages (volt) and currents (amp) in FIG. 1 respectively. ($t_0$) shows the time when a switch ($SW_1$) is turned on. The transistor (Tr1) has a collector connected to the base of transistor (Tr2), and is connected to the voltage (Vcc) through a resistor ($R_4$). The transistor (Tr1) becomes conductive when the voltage ($V_B$) is 0, and then the transistor (Tr2) becomes conductive. A capacitor ($C_2$) is connected to between the emitter and collector of transistor (Tr2), and is charged through a speed controller switch (SW2), a variable resistor (VR) of the switch (SW2) and a fixed resistor ($R_5$) when the transistor (Tr2) is nonconductive. The capacitor ($C_2$) discharges instantly when the transistor (Tr2) becomes conductive. As shown in FIG. 2, the voltage (Vc) becomes serrated at each half wave of power source (e) after the speed controller switch (SW2) is turned on at the time (t1).

($COMP_1$) is an operation amplifier of an open collector and has an inverting input (−) receiving an extremely lower voltage of the voltage (Vcc) divided by resistors ($R_6$), ($R_7$), and has a non-inverting input (+) receiving the voltage (Vc) for detecting the on and off of the speed controller switch (SW2). The operation amplifier ($COMP_1$) produces an output voltage (VD) which is flat each time the voltage (Vc) is slightly above the potential 0 after the time (t1). ($R_8$) is a load resistor for the open collector. The voltage (VD) is charged into the capacitor ($C_3$) through a resistor ($R_9$), and the charged voltage (VE) becomes approximately flat, and is instantly discharged through the resistor ($R_9$) and the operation amplifier (COMP) when the voltage (VD) becomes continuously 0 potential with the switch (SW2) being turned off. When the switch (SW2) is off (namely when the voltage VE is 0 potential), transistor (Tr3) becomes non-conductive to detect the on and off of the controller. ($R_{10}$) is a base resistor of the transistor.

($COMP_2$) is an operation amplifier of an open collector, and has a non-inverting input (+) receiving the serrated voltage (Vc), and has an inverting input (−) receiving a voltage ($V_F$) related to a motor speed electromotive force. The operation amplifier ($COMP_2$) produces an output at each phase in which the voltage (Vc) is above the voltage ($V_F$), for evaluating the motor electromotive force, thereby to determine the ignition phase of thyristors. The voltage ($V_F$) at the non-inverting input (−) of the operation amplifier ($COMP_2$) is normally sufficiently above the voltage (Vcc), so that the operation amplifier may not ignite the thyristors when the switch (SW2) is off. The transistor (Tr3) has a collector receiving the voltage (VCC) through a resistor ($R_{11}$), and collected to the base of transistor (Tr4). The transistor (Tr4) has a collector connected to the base of a transistor (Tr5) through a resistor ($R_{12}$). Therefore when the switch (SW2) is off, the transistor (Tr3) is nonconductive, transistors (Tr4), (Tr5) are conductive, so that the voltage (Vcc) may be applied to the non-inverting input (−) of the operation amplifier ($COMP_2$). A capacitor ($C_4$) is provided to prevent the transistor (Tr4) from being temporarily conductive before the transistor (Tr3) becomes conductive when the switch (SW1) is turned on in the condition that the switch (SW2) is on. A resistor ($R_{13}$) is connected to between the base and emitter of transistor (Tr5). A capacitor ($C_5$) is provided to make the voltage related to the motor speed electromotive force into the smoothed voltage ($V_F$). ($R_{14}$) is a discharging resistor of the capacitor ($C_5$).

Transistor (Tr6) has a base receiving the output voltage ($V_G$) of the operation amplifier ($COMP_2$) through a zener diode ($ZD_3$), and becomes conductive each time the voltage ($V_G$) is produced, to thereby make transistor (Tr7) conductive. Thus one of the speed control thyristors ($SCR_1$), ($SCR_2$) is ignited. The ignition is only possible when the output of the operation amplifer ($COMP_3$) is high level. When the output is low level, the zener diode ($ZD_3$) prevents the transistor (Tr6) from being conductive. ($R_{15}$) is a load resistor alike the resistor ($R_8$). ($R_{16}$) is a load resistor of the transistor (Tr6). ($R_7$) is a resistor between the base and emitter of transistor (Tr7). ($C_6$) is a capacitor for preventing the transistor (Tr7) from erroneous operation. ($R_{18}$) is a current limiting resistor of the thyristors ($SCR_1$), ($SCR_2$). Resistor ($R_{19}$) and capacitor ($C_7$) are provided to prevent the thyristors from erroneous ignition. Resistors ($R_{20}$), ($R_{21}$) are provided to balance the ignition of the thyristors. (Tr8) is a transistor for detecting the current of the motor armature, and becomes conductive through a resistor ($R_{22}$) with the falling voltage of current flowing through the normal direction of the group of diodes ($D_3$) to the base of the transistor. The transistor (Tr8) becomes nonconductive when the current disappears, namely when the armature current becomes 0 flowing through the free wheel diode ($D_5$) after the thyristors ($SCR_1$), ($SCR_2$) are off. Then the transistors (Tr9), (Tr10) become conductive and in effect, the speed electromotive force of motor (M) is applied to the non-inverting input (−) of the operation amplifier ($COMP_2$) through the diode ($D_4$), transistor (Tr10), etc.

($R_{23}$) is a load resistor of transistor (Tr8) for determining the base voltage of transistor (Tr9). ($R_{24}$) is a resistor located between the base and emitter of transistor (Tr10) for determining the potential of the base thereof. ($R_{25}$) is a load resistor of transistor (Tr9). Resistor ($R_{26}$) cooperates with resistor ($R_{14}$) to divide the motor speed electromotive force to thereby produce the voltage ($V_F$), and further cooperates with the capacitor ($C_5$) to determine the time constant of charging thereof. ($V_H$) is a motor terminal voltage. ($V_J$) is a detected voltage of armature current of motor (M). ($V_J$) is a speed electromotive force at the time of blocking the motor current. ($COMP_3$) is an operation amplifier of an open collector having a non-inverting input (+) receiving a 0 level signal from a group of resistors ($R_{27}$)–($R_{32}$) through a transistor (Tr11) to maintain the output voltage ($V_K$). The output voltage ($V_K$) becomes high level if the inverting input (−) receives a 0 level signal through diode ($D_9$) while the 0 level signal disappears at the non-inverting input (+), and then the output ($V_K$) of the operation amplifier becomes high level and this condition is maintained. Thus the operation amplifier ($COMP_3$) forms a bistable circuit. The 0 level signal is produced when the transistor (Tr4) becomes conductive at the time of turning on of the switch (SW1) while the speed controller switch (SW2) is off.

The operation amplifier ($COMP_3$) has the output connected to the output of the operation amplifier ($COMP_2$) through the diode ($D_{10}$) which prevents the high level signal of the operation amplifier ($COMP_3$) from being supplied to the output of the operation amplifier ($COMP_2$). When the output (VK) of the operation amplifier ($COMP_2$) is high level, the control circuit is in a normal performance. On the other hand, when the output ($V_K$) is 0 level, the transistor (Tr6) is prevented from being conducting so that the thyristors ($SCR_1$), ($SCR_2$) may not be operated. Transistor (Tr12) receives the detected voltage ($V_1$) of armature (Ar) through the base resistor ($R_{33}$), and is nonconductive when the armature (Ar) of the motor (M) is not energized. The transistor (Tr12) becomes conductive when the armature (Ar) is energized, even by the free wheel current flowing through the diode ($D_5$). As the result, the transistor (Tr12) having a collector receiving the voltage (Vcc) through a resistor ($R_{34}$) has a voltage ($V_L$) produced at the collector thereof to discriminate the energization and deenergization of the armature (Ar). The discriminating voltage ($V_L$) also indicates the intermittent time and the occurrence frequency of the energization and deenergization of the armature (Ar). Capacitor ($C_8$), resistors ($R_{34}$), ($R_{35}$) and diode ($D_{11}$) form a maintaining circuit of the discrimination. When the transistor (Tr12) is conductive, the charge voltage ($V_M$) of the capacitor ($C_8$) is 0. When the transistor (Tr12) is nonconductive, the capacitor ($C_8$) is charged with a time constant determined by the resistor ($R_{34}$) by way of the diode ($D_{11}$) under the influence of the voltage (Vcc). Therefore the voltage ($V_M$) is 0 level at the time of appearance of the control voltage (Vcc) when the switch (SW1) is made on. As the capacitor ($C_8$) is charged until the voltage at the base of transistor (Tr13) comes to the level above the voltage of zener diode ($ZD_4$), the transistor (Tr13) becomes conductive. Subsequently, if the voltage ($V_L$) remains above the voltage ($V_M$), the capacitor ($C_8$) continues to be charged while maintaining the conduction of transistor (Tr13) until the voltage ($V_M$) comes to the level of voltage ($V_L$). On the other hand, if the voltage ($V_L$) remains below the voltage ($V_M$), the capacitor ($C_8$) discharges through the transistor (Tr13) with the time constant determined by the resistor ($R_{35}$) while maintaining the conduction of transistor (Tr13) until voltage ($V_L$) comes to the level of the voltage ($V_M$). If the voltage ($V_L$) tends to be further lower than the level of voltage ($V_M$), and then the voltage (Vmc) becomes a zener voltage, the transistor (Tr13) is made nonconductive.

Diode ($D_{12}$) is provided to discharge the capacitor ($C_8$) when the switch (SW1) is made off. The transistor (Tr13) has a collector receiving the voltage (Vcc) through a resistor ($R_{36}$), and the collector supplies the base current of transistor (Tr11) through a zener diode ($ZD_5$) which is of the zener voltage higher than the zener diode ($ZD_4$). When the transistor (Tr13) is conductive, the collector volt is the zener voltage of zener diode ($ZD_5$) without making the transistor (Tr11) conductive. When the transistor (Tr13) is nonconductive, the collector voltage is the zener voltage of zener diode ($ZD_5$) and makes the transistor (Tr11) conductive. The conduction of transistor (Tr11) makes 0 the output ($V_K$) of operation amplifier ($COMP_3$) to thereby prevent the thyristors ($SCR_1$), ($SCR_2$) from being operated. Thus the motor (M) is stopped or is unable to start.

With the foregoing combination of component elements, the operation of the invention is as follows;

In reference of FIGS. 1 and 2, if the power source switch ($SW_1$) is closed at the time (t0), the charge voltage ($V_M$) of capacitor ($C_8$) is 0, and therefore the transistor (Tr13) is nonconductive and the transistor (Tr11) is conductive. As the result, the output voltage ($V_K$) of operation amplifier ($COMP_3$) is 0. As the voltage ($V_M$) increases, the transistor (Tr11) becomes nonconductive. On the other hand, the voltage ($V_A$) subsequently becomes a full wave rectified voltage. The transistor (Tr1) is made nonconductive for an extremely short period of time by the voltage ($V_B$) which is 0 in an extremely short period of time at the vicinity of 0 potential of voltage ($V_A$). Then the transistor (Tr1) supplies the base voltage to the transistor (Tr2). If the speed controller switch ($SW_2$) if off, the voltage ($V_C$) is 0, and therefore the output ($V_D$) of operation amplifier ($COMP_1$) is 0, the transistor (Tr3) is nonconductive, the transistor (Tr4) is conductive and the output ($V_K$) of operation amplifier( $COMP_3$) is high level.

The speed controller switch ($SW_2$) is on at the time (t1), the transistor (Tr1) becomes non-conductive each time the voltage ($V_B$) becomes 0 to discharge the capacitor ($C_2$). During the nonconductive period of transistor (Tr1), the capacitor ($C_2$) is charged through the controller variable resistor (VR) and resistor ($R_5$) and produces the serrated waves ($V_C$). The capacitor ($C_8$) finishes charging at the time (t1), and the voltage ($V_M$) and voltage ($V_L$) are the voltage which is an addition of the voltage (Vcc) divided by the resistors ($R_{34}$), ($R_{35}$), and the zener voltage of zener diode ($ZD_4$). The capacitor ($C_5$) finishes charging at the time (t1) due to the conduction of transistors (Tr4), (Tr5), and the voltage ($V_F$) is the voltage (Vcc), and therefore the output ($V_G$) of operation amplifier ($COMP_2$) is 0 level. Accordingly, the transistors (Tr6), (Tr7) are nonconductive and the thyristors ($SCR_1$), ($SCR_2$) are not ignited.

If the speed controller switch ($SW_2$) is closed (in this case the variable resistor ($V_R$) is made comparatively high to drive the motor (M) at a low speed as shown in the solid lines in FIG. 2), the voltage ($V_C$) is produced with the inclination as shown, and the voltage ($V_D$) is produced in the inclined parts of the voltage ($V_C$), and is smoothed by the capacitor ($C_3$). The smoothed voltage ($V_E$) makes the transistor (Tr3) conductive. When the transistors (Tr4)(Tr5) become nonconductive, the charge of capacitor ($C_5$) is discharged through resistor ($R_{14}$). The voltage ($V_G$) is produced when the voltage ($V_C$) comes to the level above the voltage ($V_F$) at the time (t2), and the transistors (Tr6), (Tr7) become conductive, and then one of the thyristors ($SCR_1$), ($SCR_2$) is ignited to supply the motor terminal voltage ($V_H$), thereby to start the motor (M). It is to be assumed that the motor (M) is loaded with a rated load.

If the voltage ($V_C$) is 0, the voltage ($V_G$) becomes 0, and then the thyristors ($SCR_1$), ($SCR_2$) become extinct in a little later phase (t3). The motor terminal voltage ($V_H$) therefore becomes 0, but due to the inductance of motor armature (Ar), a short-circuit flows until the time (t4) through the diodes ($D_3$), ($D_5$) and the armature (Ar). The current of the armature (Ar) is indicated by Iar in FIG. 2. In the meantime, the transistor (Tr8) becomes conductive due to the falling voltage ($V_L$) of current flowing in the normal direction of diode ($D_3$), and the transistors (Tr9), (Tr10) are nonconductive. The capacitor ($C_5$) continues to discharge, and the voltage ($V_F$) further falls. At the time (t4), the armature current disappears, and then the transistor (Tr8) becomes nonconductive and the transistors (Tr9), (Tr10) become conductive, and the armature (Ar) produces an extremely small speed electromotive force which is proportional to the motor speed. This is normally due to the field residue magnet (St). Generally, since the inductance of the field magnet (St) is remarkably higher than that of the armature (Ar), the speed electromotive force is considerably increased more than the one due to the normal residue magnet, by the circulating current flowing through the free wheel diode ($D_4$) in FIG. 1. The speed electromotive force provides an extremely small amount current circuit of diode ($D_4$), transistor (Tr10), resistors ($R_{26}$), ($R_{14}$), diode ($D_6$) and armature (Ar). This is shown as the voltage (V1) falling in the normal direction of diode ($D_6$). The speed electromotive force is shown also by the motor terminal voltage ($V_H$). The voltage ($V_F$) of capacitor ($C_5$) increases a little in response to the voltage ($V_J$). If the voltage ($V_C$) comes to the level above the voltage ($V_F$) at the time (t5), the thyristors ($SCR_1$), ($SCR_2$) are ignited, and the voltage ($V_F$) lowers gradually. After the extinction of the thyristors, the voltage ($V_F$) rises due to the speed electromotive force. Such operations of the capacitor ($C_5$) and of the thyristors are repeated at each half cycle of the power source (e).

The transistor (Tr12) becomes conductive at the time (t2) just like the transistor (Tr8), and the voltage ($V_L$) becomes 0, and the capacitor ($C_8$) discharges through resistor ($R_{35}$), transistor (Tr13), and zener diode ($ZD_4$), and lowers the voltage ($V_M$). Since the voltage ($V_J$) is 0 between the time (t4) and the time (t5), then the transistor (Tr12) is nonconductive, and the capacitor ($C_8$) is charged through resistor ($R_{34}$). The voltage ($V_M$) of capacitor ($C_8$) is balanced after progressively accumulating the voltage above the level caused by the repetitive operations of the capacitor. If the motor (M) is loaded at the time (t6), in lapse of time then the rotation speed of the motor lowers, and therefore the load current increases. The current flows through free wheel diode ($D_5$) for a longer time after the extinction of thyristors ($SCR_1$), ($SCR_2$), namely after the voltage (VH) is 0 the falling down of the speed electromotive force due to the speed down of motor causes the fall of voltage ($V_F$). The ignition phase of thyristors ($SCR_1$), ($SCR_2$), which is determined by the intersection of the voltage ($V_C$) and the voltage ($V_F$), advances to increase the effective voltage ($V_H$) and to further increase the current. The fall of voltage ($V_H$) is shown abruptly for the sake of convenience, but actually this takes a certain period of time due to the charging time constant of capacitor ($C_5$). As the time is shorter in which the current (Iar) is absent, the capacitor ($C_8$) discharges for a time longer than the time for charging. Therefore the balanced point of the charged voltage depends on a period in which the current (Iar) is absent.

In FIG. 2, ($V_Z$) is a voltage point of voltage ($V_M$). This is a zener voltage of zener diode ($ZD_4$). As the absent time of current (Iar) becomes shorter until it comes to the time (t7) at which the voltage ($V_M$) becomes voltage ($V_Z$), the transistor (Tr13) becomes nonconductive, and the output ($V_K$) of operation amplifier ($COMP_3$) has low potential and therefore preventing the thyristors ($SCR_1$), ($SCR_2$) from being ignited. The motor (M) is therefore stopped at the time (t8) with no power supplied. In this embodiment, the constant voltage ($V_Z$) is employed to detect the time in which the current (Iar) is absent for the purpose of determining the excess load ignition phase blocking the power supply to the motor (M). The zener diodes ($ZD_4$), ($ZD_5$) become unnecessary in case a more excessive load ignition phase is detected at the absent time 0 of current (Iar) for blocking the power supply to the motor (M).

The variable resistor ($V_R$) may be adjusted to a comparatively lower resistance to drive the motor (M) at a high speed. The explanation will be made with the additional chain lines in FIG. 2, in which description of the voltages ($V_C$), ($V_F$) is omitted.

The ignition phase t'2) shown by voltage ($V_H$) in a rated load of the motor advances ahead of the phase (t2), and the effective voltage applied to the motor (M) is higher than that in the aforementioned low speed drive of the motor, and the current (Iar) is higher, and further the speed electromotive force shown by the voltage ($V_H$) is higher. Although the speed electromotive force is shown to be produced at the vicinity of time (t3), it is produced as well during the time t'2-t3 when the power is supplied to the motor (M), actually the speed electromotive force is offset by the supply voltage or by the electromagnetic energy of the armature (Ar) after the supply voltage is blocked. The speed electromotive force functions to suppress the current (Iar) when the speed electromotive force comes to the level above the supply voltage indicated by the voltage ($V_H$) during the supply of power, especially at the vicinity of time (t3). Therefore, if the motor is excessively loaded, the absence of current (Iar) is detected as well at the time (t'7) when the current is extremely increased at a high speed rotation more than at a low speed rotation, and then the motor current is blocked. When the motor (M) is stopped, the capacitor ($C_8$) is charged again, and the transistor (Tr11) becomes nonconductive. The transistor (Tr4) remains nonconductive while the switch (SW$_2$) is on. Therefore the output ($V_K$) of operation amplifier (COMP$_3$) maintains 0 level. When the speed controller switch (SW$_2$) is off, the output ($V_K$) of operation amplifier (COMP$_3$) becomes high level, and the motor (M) is prepared to start again.

If the switch (SW$_1$) is on while the switch (SW$_2$) is on, the transistor (Tr11) becomes conductive and the output ($V_K$) of operation amplifier (COMP$_3$) becomes 0 level as already mentioned. Since the switch (SW$_2$) is on and the inverting input (−) of operation amplifier (COMP$_1$) is set to an extremely low voltage, the capacitor ($C_2$) makes high level the output ($V_D$) of operation amplifier (COMP$_1$) at the initial charge of the capacitor, and maintains the high level of the output ($V_D$) to make the transistor (Tr3) conductive. The transistor (Tr4) has the base voltage, produced when the switch (SW$_1$) was turned on, temporarily grounded by the capacitor ($C_4$). The base current will not be supplied by the subsequent conduction of transistor (Tr3) and accordingly the transistor (Tr4) remains nonconductive. Therefore the output ($V_K$) of operation amplifier (COMP$_3$) maintains 0 level, and the motor (M) will not start. If the switch (SW$_2$) is off, the transistor (Tr4) is conductive and the output ($V_K$) of the operation amplifier becomes high level, allowing the motor (M) to start if the switch (SW$_2$) is on.

I claim:

1. A safety control device for a speed control circuit of a commutator motor having an armature and a stator and including an A.C. power source having predetermined power source periods, said motor being energized with a supply current from the A.C. power source and being provided with circuit means which cause a free wheel current to be produced in the motor by the inductance of the motor, said free wheel current flowing in the armature and the stator of the motor, a motor speed controller, a comparator circuit comparing a voltage due to an operated amount of the motor speed controller with a voltage due to an actual rotation speed of the motor, an ignition circuit responsive to an output of the comparator circuit and producing a signal, and semiconductor control elements responsive to the signal from the ignition circuit to make a full wave phase control of the motor supply voltage to thereby compensate for rotational variations of the motor, the control device comprising armature current detecting circuit means coupled to the motor armature and operative to detect successively, all through the power source periods and with the advance of the power source periods, the presence and absence of the sections of time series in which the supply current and the free wheel current flow in the armature of the motor; voltage maintaining circuit means connected to said detecting circuit means and being initially set to a level below a predetermined amount of voltage at the time of application of the power source to the motor, said maintaining circuit means being operative to progressively accumulate the voltage above the level in a lapse of time and to decrease the voltage when the supply current and the free wheel current flow in the armature of the motor or to increase the voltage when the supply current and the free wheel current cease to flow in the armature of the motor and to maintain the voltage over at least one cycle of the power source; and bistable circuit means connected to said ignition circuit and operative for nullifying said ignition circuit when said maintaining circuit means has a voltage below the level of said predetermined amount of voltage, said bistable circuit means switching the ignition circuit into an effective condition as said maintaining circuit means comes to accumulate the voltage above the predetermined level while no speed designation is made to the speed control circuit of the motor.

* * * * *